April 29, 1958 F. M. JOHNSON 2,832,632
EXPLOSIVE/MECHANICAL, SINGLE MOUNT BOMB RACK
Filed April 19, 1956
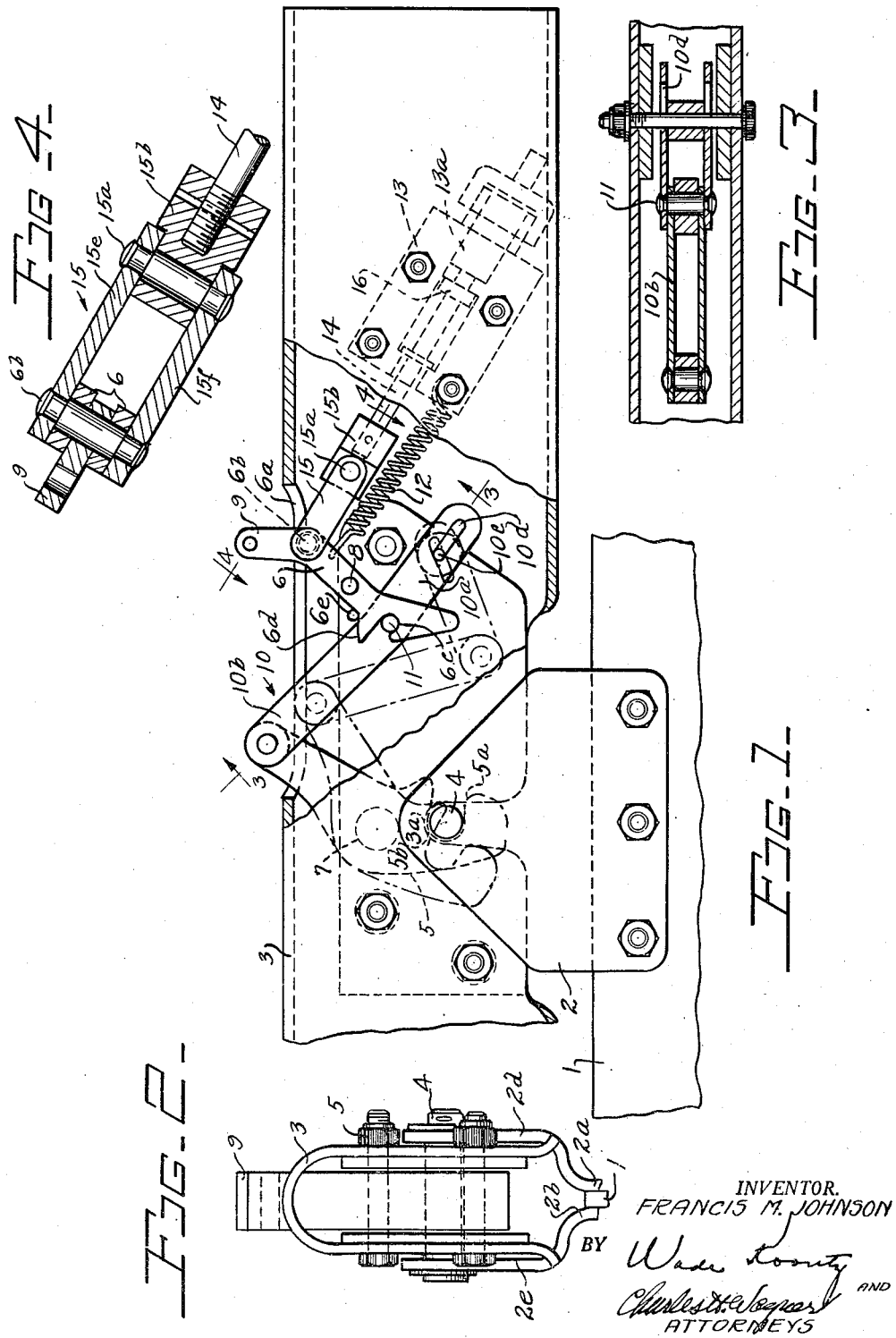
INVENTOR.
FRANCIS M. JOHNSON
BY
ATTORNEYS

2,832,632
EXPLOSIVE/MECHANICAL, SINGLE MOUNT BOMB RACK

Francis M. Johnson, Dayton, Ohio, assignor to the United States of America as represented by the Secretary of the Air Force Application April 19, 1956, Serial No. 579,419

6 Claims. (Cl. 294—83)

(Granted under Title 35, U. S. Code (1952), sec. 266)

The invention described herein may be manufactured and used by or for the United States Government for governmental purposes without payment to me of any royalty thereon.

This invention relates to a new and unique type of quick release mechanism, and more particularly, to a hook type release for supporting a load to an aircraft.

The development of the modern military type aircraft coincidental with the numerous and the variety of duties assigned thereto led to the requirement for a rack as a support for loads carried by said aircraft. This rack is preferably mountable either beneath the wing of the aircraft or from within the aircraft itself. Furthermore, said rack also should include a mechanism with which to release the load carried thereby. The release is preferably automatic in operation but should also be manual in the event a malfunction occurs.

It is an object of the invention, therefore, to provide an improved rack to be mounted either beneath the wing of an aircraft or from within the aircraft for the purpose of releasably supporting stores, bombs, fuel tanks, airborne lifeboats, "parasite" aircraft, missiles, and other jettisonable loads.

It is a further object of the invention to utilize a release mechanism which eliminates the not insignificant number of "hang-ups" inherent in certain other mechanisms and thereby assures a complete separation of the load carried thereby.

An additional object of the invention is to provide a quick release mechanism incorporating a self-locking hook providing a single mount and normally held in its locked position by a positive lock arm, the latter either explosively or manually operable.

Other objects and advantages of the invention will become apparent from the following description, taken in connection with the accompanying drawings in which like reference characters refer to like parts in the several figures.

Fig. 1 is a side elevation of the quick-release mechanism utilized in the invention showing the load-supporting bracket in its suspended position.

Fig. 2 is an end view of the quick-release mechanism of Fig. 1 illustrating details of the load-supporting bracket.

Fig. 3 is a sectional view taken about on line 3—3 of Fig. 1 showing details of the intermediate linkage.

Fig. 4 is a sectional view taken about on line 4—4 of Fig. 1 showing details of the connection between the explosive device and the intermediate linkage.

With reference to the following description, it is noted that no showing is made either of the attachment of the release mechanism to an aircraft or of the load supported thereby since this forms no part of the present invention.

Referring to the drawings and particularly to Fig. 1, reference numerals 1 and 2, respectively, denote a load-supporting plate or flange and a bracket. The bracket 2 is supported on the flange 1 which has been previously attached to any desired auxiliary load, as for example, a bomb, an aircraft fuel tank or the like. Said bracket 2, in turn, is suspended from the main support rack 3 by the quick-release mechanism of the invention hereinafter described. It is noted that said mechanism includes structure that provides a single mount for suspending the bracket 2 and the load carried thereby.

The load-carrying bracket 2, as seen clearly in Fig. 2, consists of two separate parallel plates 2a and 2b, each of which is secured on opposite sides of the supporting plate or flange 1. The plates consist of a first straight lower portion 2a—2b affixed to said flange, an intermediate curved portion and a second straight upper portion 2d and 2e extending above said flange, said straight portions 2a and 2b, and 2d and 2e being parallel to each other with the space between said upper portions 2d, 2e being larger than that between said lower portions. A bar or rod 4 is attached between said upper parallel plate portions and provides the means for suspending the particular auxiliary load from the release mechanism hereinafter described.

The rack 3 consists of an inverted U-shaped plate or support member between the legs of which the release mechanism of the invention is positioned. Said plate or support member includes a recessed or slotted portion 3a into which the bar or rod 4 is received when in the mounted or load-supported position. Said release mechanism comprises a self-locking hook member 5 interconnected with the positive lock hook member 6, the former having a half-circle or hook portion 5a into which portion the main support bar or rod 4 engages when in the suspended or locked position. Said hook member 5 is pivoted at an intermediate point about the pivot 7 to the rack 3 and said positive lock hook member 6 is pivoted about the pivot 8 positioned on said rack. The upper end of the hook 6 extends through an opening 6a in the upper portion of the rack 3 to terminate in a handle 9. Said hook members, 5 and 6, are interconnected by means of the intermediate linkage 10 which is positioned therebetween. The second mentioned hook member 6 acts as a positive lock for the first mentioned hook member 5 through action of said intermediate linkage 10. The linkage 10 consists of two links 10a and 10b pivoted to each other as seen in Fig. 1 and Fig. 3 by the roller pivot 11 which is normally engaged in the hook portion 6c of the second mentioned hook member 6 to provide a rigid and substantially straight line non-collapsed interconnection between the two members, 5 and 6, and between the rack 3 and said member 5. Said hook member 6 is self-locking by means of the tension spring 12 connected between the upper portion of the member 6 and the cylinder 13, said spring 12 normally urging said links 10a and 10b and the first hook member 5 to or toward the locked or load-supporting position. A piston rod 14 is pivotally connected to said second member 6 by an intermediate link member 15, the latter being pivotally connected to said piston rod at one end thereof and at its other end to said hook member 6 at pivot point 6b adjacent the upper handle end 9 of said member 6. Said link member 15 is pivotally connected to said piston rod 14 by means of the intermediate member 15b which is rigidly fixed at one end to said piston rod 14 and pivotally engages said link 15 at its other end by the pivot 15a. The intermediate member 15b comprises a rectangular block with cutaway portions at its opposite sides for approximately one-half its total length, as clearly seen in Fig. 4. Said cutaway portions receive one end of said intermediate link 15, pivotally connected by the pivot 15a. The recessed or cutaway portions are of such a depth that the sides of said link member 15 extend slightly beyond the sides of said intermediate member 15b. Furthermore, one end of a tension spring 12 is affixed to the cylinder 13 as viewed in Fig. 1, and the other end thereof is pivoted to the positive lock member 6 which is normally retained in its locked position under tension of this spring. The spring 12 is under sufficient tension so that the hook portion of the positive lock member 6 is held in engagement with the pivot roller 11 thereby retaining the intermediate linkage 10 in its rigid or straight-line position. During this latter position, the first hook member 5 is locked in its vertical or load-suspending position by means of the rigid intermediate toggle-like linkage 10 pivoted thereto. When it is desired to release the bar or rod 4 and the auxiliary load carried thereby, the rigid straight line relation between the links 10a and 10b is broken and the intermediate pivot roller 11 is cammed in a downward direction by the cam 6d of hook 6. Once this latter event has occurred, the self-locking hook member 5 is then free to rotate in the clockwise direction under the action of gravity acting on the load carried thereby. This operation will be hereinafter described in greater detail. The piston 14 hereinbefore described comprises part of the power means for operating said release mechanism hereinafter described in detail.

Referring particularly to Fig. 4, a more detailed showing of the intermediate member 15b is illustrated. The recessed or cutaway portions previously described provide a narrower portion in the left half of said member 15b. The intermediate link member 15 consists of spaced parallel links 15e and 15f seated on said narrower portion and pivotally mounted thereto by the pivot 15a. A pivot arrangement is provided for the other end of said link 15 by means of the pivot 6b mounted on the hook member 6.

The power means previously mentioned for operating the release mechanism of the invention constitutes the cylinder 13 which includes a chamber 13a adapted to contain an explosive squib and a piston 16 to which said piston rod 14 is affixed, the piston rod 14 being connected to the hook member 6 by means of the intermediate link 15 as previously described. Said power means is actuated by firing the explosive squib in the chamber 13a in any desired manner. On explosion of said squib, the expanding gases formed thereby act on the piston 16 forcing its piston rod 14 forward to rotate the hook member 6 and thereby operating the release mechanism to release the load carried thereby in a manner to be described in detail hereinafter. It is noted that said hook member 6 is limited in its clockwise rotation under tension of the spring 12 by a stop member 6e which, likewise, limits the straight-line or erected position of the intermediate linkage 10.

The first self-locking hook member 5 is normally held in its vertical or locked position by reason of its connection to the intermediate linkage 10 normally held in the rigid position by the engagement of its roller pivot 11 in the hook portion 6c of the second hook member 6. It is noted that the link 10a is slidably and pivotally connected to the rack 3 by means of a pin 10c that is mounted on said rack and engages the left or inner ends of the slots 10d in one end of said links 10a. This pin and slot arrangement, therefore, permits the rigid relation between the link 10a and the link 10b and the pin 10c to be broken and pivoted to their nonlocking position as shown in dotted lines in Fig. 1. Moreover, said hook member 6, includes a cam surface 6d located adjacent its hook portion, the purpose of said cam surface being to positively cam the roller pivot 11 to break the rigid straight-line connection in the intermediate linkage 10 between the hook 5 and the pin 10c and thereby release the first hook member 5 from its locked or load-retaining position. At this point, it is to be noted that the seat of the hook portion 5a of the member 5 is off-center relative to a vertical plane through the pivot point 7 so that on release thereof from its locking engagement with the hook member 6 the load carried thereby rotates said member 5 in the clockwise direction to release its engagement with said load. To insure that the main support bar or rod 4 is positively ejected from its engagement with said hook portion 5a, the first hook member 5 includes a cam surface 5b adjacent and above its hook portion which cam surface engages the periphery of said rod 4 to impart a positive downward movement thereto during rotation of said hook member 5 to its load-released position.

An important characteristic of the invention resides in the self-locking feature of the release mechanism. Of course, the tension spring 12 aids in retaining the hook members 5 and 6 and the intermediate linkage 10 in the locked position; however, the inherent rigid connection between the links 10a and 10b, the hook member 5 and the pin 10c, assures a locked condition until the pivot roller 11 is cammed downwardly by the cam surface 6d to break said rigid or straight-line relation. This latter action cannot occur until the positive lock member 6 is rotated in the counterclockwise direction to release its hook portion from engagement with said roller 11. Once the release operation has occurred, the released position of the intermediate linkage 10 remains as disclosed in dotted lines in Fig. 1, the first hook member 5 remains in its rotated position, and the second hook member 6 returns under action of the spring 12 to its original locking position. At this point, it is only necessary to seat a second main support bar or rod 4 with a new load attached thereto in the hook portion 5a. To accomplish this step, the bar 4 is "snapped" upwardly in the recess or slot 3a against the cam surface 5b, causing the hook 5 to rotate in a counterclockwise direction to its vertical or load-supporting position, which returns the intermediate toggle linkage 10 to its near straight-line or rigid position. This latter action raises the pivot roller 11 until it contacts the projecting nose portion of the second hook arm 6, rotates the latter against the tension of spring 12 until the roller 11 finally snaps into place in the hook portion 6c of said arm 6. At this time, the new load is locked in position entirely through the self-locking feature of the release mechanism as described above.

To summarize the complete power operation of the release mechanism of the invention, first, an explosive squib in the cylinder chamber 13a is fired by any desired means, second, the expanding gases formed thereby act on the piston 16 driving its piston rod 14 forward, which rotates the positive lock member 6 in a counterclockwise direction, third, the hook portion of the now-rotating hook member 6 is first released from engagement with the roller pivot 11 and substantially simultaneously its cam surface 6c positively engages and breaks the rigid toggle connection between the links 10a and 10b of the intermediate linkage 10 and the pin 10d, fourth, the rigid locking engagement on the first member 5 is now released by virtue of the latter's connection to the intermediate linkage 10 and, last, the now collapsing linkage 10 permits the auxiliary load to rotate the first hook member 5 in a clockwise direction to release said load under the force of gravity. It is noted, also, that should there be a malfunction in the power mechanism or should it be desired to effect a load release without firing the explosive squib, said release mechanism may be manually actuated by the handle 9 from a cable connected thereto to release the hook member 5 and the load in the same manner as described above for power operation.

Thus, a novel and simple release mechanism has been provided which is dependable in operation, unique in design and, yet, securely retains and positively ejects an object carried thereby.

I claim:

1. A quick-release mechanism in combination with a main support rack housing said mechanism having a pair of depending vertical walls incorporating a pair of vertically extending, elongated slots therein, and an auxiliary load-support member releasably suspended from said release mechanism in engagement with said main support rack in said vertically extending slots, said release mechanism comprising a cylinder having a chamber adapted to contain an explosive squib, a piston and piston rod positioned in said cylinder, a first arm pivoted to said rack interconnected to said piston rod at a position above the pivot of said first arm to said rack and having a hook portion and a cam surface adjacent thereto, a second arm having a hook portion pivoted to said rack, and an intermediate linkage interconnected between said first and second arms, said linkage comprising two members pivoted to each other, one of said members pivotally and slidably mounted on said rack and the other of said members pivoted to said second arm at a position above the pivot of said second arm to said rack, an element mounted on the pivot between said two members in engagement with the hook portion of said first arm to maintain a rigid connection between said first and second arms and thereby lock said auxiliary load-support member in engagement between the hook portion of said second arm and the walls on one side of said slots, and a tension spring between said first arm and said cylinder normally urging the former to an operative position to retain said first-mentioned hook portion in engagement with said element to maintain the rigid connection between said first and second arms, said cam surface engaging said element on release operation of said mechanism to urge the pivot between said first and second arms to an inoperative position to break the rigid connection therebetween and thereby unlock said second arm to release the auxiliary load-support member carried thereby.

2. In a support for releasably suspending an auxiliary load on an aircraft, a main support rack having a pair of vertical walls depending therefrom with an elongated slot in each of said walls, a quick-release mechanism positioned on said rack, and a load-support member releasably suspended from said rack in slidable engagement within said slots, said release mechanism comprising a cylinder mounted on said rack, a piston and piston rod mounted in said cylinder and operable to a load-release position, a first hook member pivoted to said rack between an operative and an inoperative position, an intermediate member fixed at one end to said piston rod, a connecting link between said intermediate member at one end thereof and said first hook member at the other end thereof at a position above the pivot of said first hook member to said rack, a second hook member pivoted to said rack between a load-supporting and a load-releasing position, said second hook member having a hook portion positioned between said vertical walls in engagement with and retaining said load-supporting member in engaged position between said hook portion and one side of said elongated slots, a pair of links pivoted to each other and interconnected between said rack and said second hook member at a position above the pivot of said second hook member to said rack, said pair of links being movable between a rigid, load-supporting position and a nonrigid, load-releasing position, the hook portion of said first hook member being in engagement with the pivot between said pair of links when in its operative position to retain said links in said rigid, load-supporting position, a cam surface on said first hook member in engagement with said pivot to move the latter to said nonrigid, load-releasing position when said first hook member is pivoted to its inoperative position, and a tension spring between said cylinder and said first hook member urging the latter to its operative position.

3. In a releasable load support, a load-supporting rack member having spaced side plates and formed with an upwardly extending vertical recess therein for receiving a load-carrying bar member upwardly therein, a load-carrying, self-locking hook member pivoted intermediate the side plates above said recess and at one side of a vertical plane through said recess, said hook member having a hook portion at its lower end below said pivot for engaging and supporting said load-carrying bar in said recess and formed with a cam thereon movable alongside the top portion of said recess between said side plates when said hook member is moved to an inoperative position for displacing engagement with said bar member during upward movement thereof in said recess to return said hook member to an operative position and engaging with said bar member during downward movement thereof in said recess to positively eject said bar member subsequent to release thereof from the hook portion of said hook member, said hook member having an upper portion extending above the opposite side of said pivot, a toggle member comprising a pair of links pivotally connected together, their free ends pivotally connected to said upper portion and to said load support rack at a point spaced from said hook member pivot at one side of said vertical recess, said toggle link pivots being in substantial alignment when said hook member is in operative position and collapsed when said hook member is in inoperative nonload-supporting relation, one of said pivotal connections between said links and the upper portion and the rack comprising a slot and pin connection extending longitudinally relative to said links, a self-locking hook pivoted to said rack above the pivot between said toggle links and having a hook portion engageable with said pivot when said toggle links are in erected relation, said self-locking hook having an actuating handle portion projecting beyond its pivotal connection, resilient means normally urging said hook portion into locking engagement with said toggle links pivotal connection, said last mentioned hook portion having a cam engageable with said pivotal connection for engaging and collapsing said toggle links, and power means connected between said rack and said self-locking hook for moving the latter to release position.

4. Apparatus as claimed in claim 3 including a common stop member for limiting movement of said toggle links to their erected relation and limiting movement of said self-locking hook member to its operative position.

5. Apparatus as claimed in claim 3 in which said power means comprises a cylinder fixed on said rack and adapted to receive an explosive squib therein, a piston in said cylinder, a piston rod connected to said piston and extending out of said cylinder, a link member connected at one end to said piston rod and at its other end to said projecting handle portion of said self-locking hook member.

6. Apparatus as claimed in claim 3 wherein said projecting actuating handle portion extends above the top of said rack for actuating said self-locking hook member independently of said power means.

References Cited in the file of this patent

UNITED STATES PATENTS

| | | |
|---|---|---|
| 1,338,724 | Gledhill | May 4, 1920 |
| 1,383,252 | Wearham | June 28, 1921 |
| 2,443,629 | Matuszewski | June 22, 1948 |
| 2,625,423 | Hight | Jan. 13, 1953 |